Nov. 26, 1968 H. J. LIPPMANN ET AL 3,412,590

DEVICE FOR FORMING METAL WORKPIECES

Filed Sept. 15, 1965 3 Sheets-Sheet 1

DEVICE FOR FORMING METAL WORKPIECES

United States Patent Office 3,412,590

Patented Nov. 26, 1968

3,412,590
DEVICE FOR FORMING METAL WORKPIECES

Hans Joachim Lippmann, Nuremberg, and Horst Schenk, Erlangen, Germany, assignors to Siemens Aktiengesellschaft, Erlangen, Germany, a corporation of Germany Filed Sept. 15, 1965, Ser. No. 487,449
Claims priority, application Germany, Sept. 19, 1964, S 93,239
6 Claims. (Cl. 72—56)

ABSTRACT OF THE DISCLOSURE

Device for forming metal workpieces by pulsed magnetic fields includes a compression coil, and a field concentrator snugly contained within the coil, the field concentrator comprising at least two portions each located oppositely spaced from one another in a direction transversely to a longitudinal axis and defining therebetween an opening having an axis substantially coinciding with the longitudinal axis for relatively intimately receiving therein an elongated workpiece having varying cross section along the length thereof, and insulating means on the inner surface of the field concentrator portions within the opening and in the space between the portions for insulating the field concentrator from the workpiece and the field concentrator portions from one another, the insulating means extending radially within the space and having an outer limiting edge located substantially at the outer surface of the field concentrator.

Figure 1A:
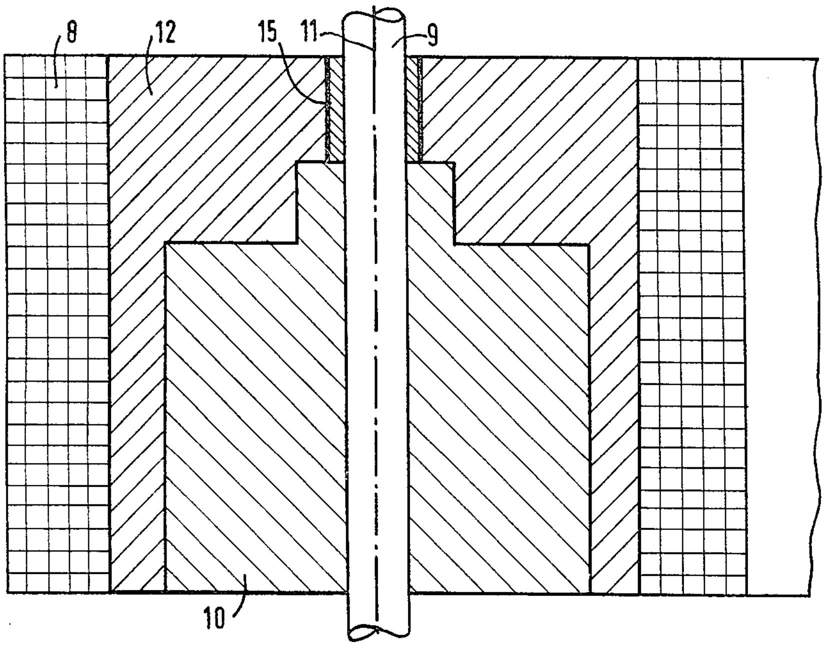

Our invention relates to metal workpiece forming. More particularly, it relates to an improved metal workpiece forming device capable of producing workpieces of diverse configurations.

In recent years, new techniques and devices have been evolved in the technology of metal workpiece forming which has made possible much more rapid workpiece formation than had existed theretofore. Such techniques and the devices employed therein have been generally referred to as being of the "high-speed" type. Among the latter, one of the most efficacious types of techniques and devices has been the magnetic forming type.

The magnetic forming technique, disclosed in U.S. Patent 2,976,907 of G. W. Harvey et al. entitled "Metal Forming Device and Method," dated Mar. 28, 1961, is based upon the fact that a variable magnetic field can be made to exert a pressure upon a metal surface. Thus, an axially directed pulsating magnetic field may be caused to be built up, for example, in an air core coil containing a metal workpiece therein through the discharge of a high voltage capacitor. It has been found that such axially directed pulsating magnetic field produces peripheral eddy currents within the workpiece. Because of the skin effect, the aforesaid peripheral currents are essentially limited to the outer skin of the workpiece provided that the electrical conductivity of the workpiece and the frequency of the tuned circuit formed by the workpiece containing coil, i.e., the work or compression coil and the aforesaid high voltage capacitor, are respectively of sufficiently high magnitude. Consequently, the inner cross-sectional portion of the workpiece is essentially fieldfree whereby the pulsating magnetic field is concentrated in the gap defined between the coil and the workpiece.

In order to exert the greatest possible pressure upon a cylindrical workpiece, the air gap between the work or compression coil and the workpiece should be made to be as small as possible. For precisely fitting the work or compression coil to the workpiece, it has been known to use cylindrical field concentrators which have a radially disposed slot therein. With such concentrators, the magnetic field is concentrated in a small cross-sectional area by the eddy currents which flow at the inner and outer surfaces.

Utilizing known work or compression coils and field concentrators in magnetic pulse workpiece forming techniques has failed to solve many problems presented in the use of such techniques. For example, it has not been possible to force two or more bodies upon a base with a uniform cross section where the bodies encompass relatively snugly the base member at point of workpiece formation treatment but which have larger respective cross sections at their portions at the respective ends of the base member. In addition, the known work or compression coils and the field concentrators do not enable the connecting of two base members, such as pins, for example, at the center of the smaller cross section locality by a metal tube.

It is, accordingly, an important object of this invention to provide a metal workpiece forming device comprising compression coils and field concentrators which enables the forming of two or more bodies on a uniform cross section base member where the end portions of the bodies toward the ends of the base member have cross sections which are greater than the cross sections of the portions of the bodies which encompass the base at the pulse forming treatment point.

It is another object to provide a metal workpiece forming device in accordance with the preceding object which enables the connecting of two base members by a metal tube at the center of the locality of the smaller cross section.

The foregoing objects are achieved by providing a device for forming metal workpieces comprising a compression coil and a field concentrator in which the field concentrator is constructed of several parts which are insulated from each other. Thus, the field concentrator may, for example, be constructed of two parts. A slotted field concentrator arrangement is advantageously employed in which at least one smaller field concentrator comprising at least two parts is arranged as an insert, preferably concentrically disposed within the compression coil.

Generally speaking and in accordance with the invention, there is provided in a device for forming metal workpieces by pulsating magnetic fields and comprising a compression coil, a field concentrator snugly contained within the coil. The field concentrator comprises a plurality of discrete fitted parts insulated from each other and is adapted to relatively intimately receive therewithin a workpiece having different cross sections along its length. Means are provided on the inner surface of the field concentrator for insulating the field concentrator from at least a portion of the workpiece whereby upon the generation of a magnetic pulse in the concentrator, discrete peripheral eddy currents are produced in the respective surfaces of the parts of the field concentrator.

The foregoing and more specific objects and features of our invention will be apparent from, and will be mentioned in the following description of devices for forming metal workpieces according to the invention taken in conjunction with the accompanying drawing.

Figure 1B:
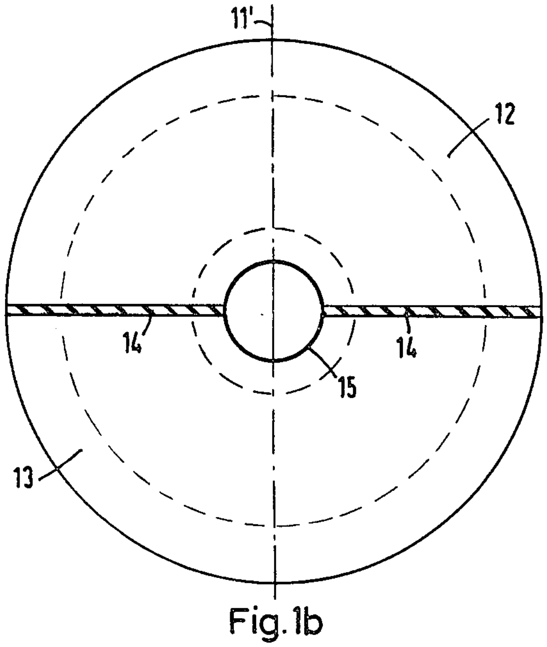
Figure 2A:
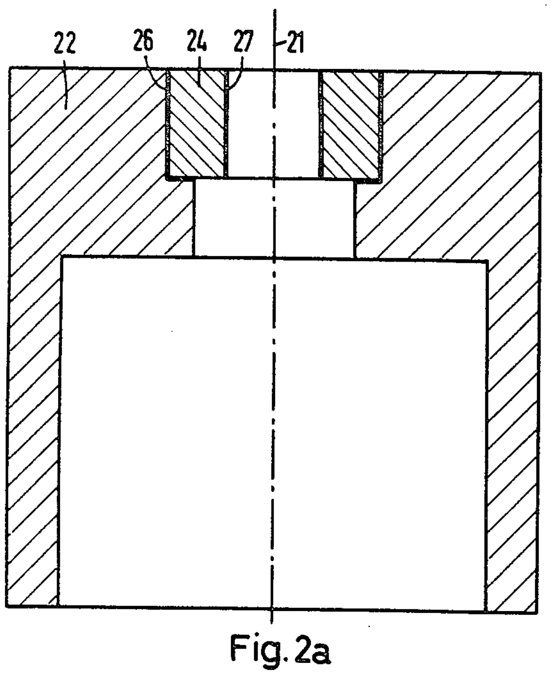
Figure 2C:
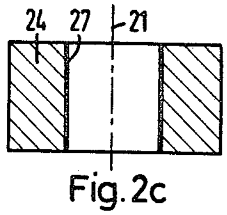
Figure 2D:
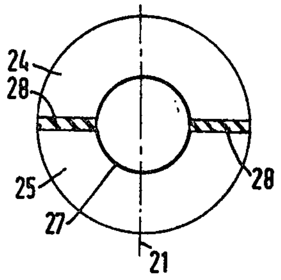
Figure 2B:
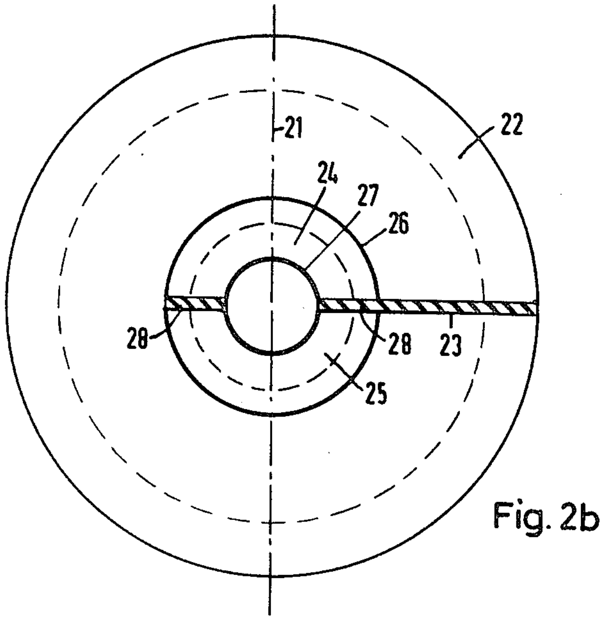
Figure 3A:
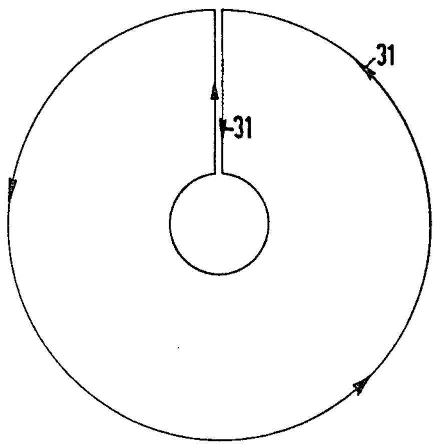
Figure 3B:
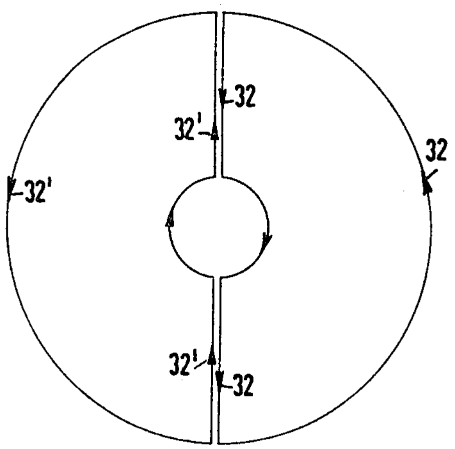
Figure 3C:
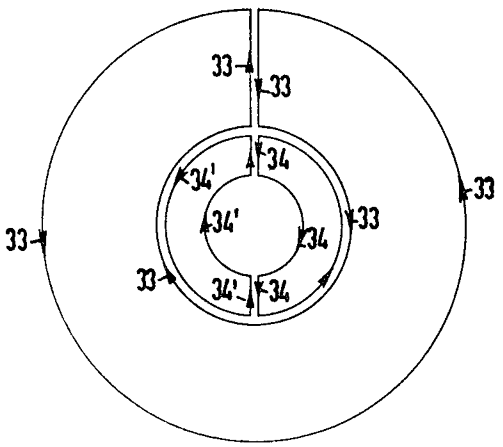

In the drawing, FIGS 1*a* and 1*b* are respectively a vertical cross-sectional view and a plan view of an illustrative embodiment of a field concentrator in a metal workpiece forming device constructed in accordance with the principles of the invention;

FIGS. 2*a* and 2*b* are respectively a vertical cross-sectional view and a plan view of another embodiment of a field concentrator according to the invention;

FIGS. 2*c* and 2*d* are respectively a vertical cross-sectional view and a plan view of the insert employed in the field concentrator shown in FIGS. 2*a* and 2*b*;

FIG. 3*a* is a schematic depiction showing the flow path of the eddy current generated in the surface of a known type of field concentrator as a result of magnetic pulsing;

FIG. 3*b* is a depiction similar to that of FIG. 3*a* showing the flow paths of the discrete peripheral eddy currents generated in the surfaces of the parts of a field concentrator as depicted in FIGS. 1*a* and 1*b* as a result of magnetic pulsing; and FIG. 3*c* is a depiction similar to that of FIGS. 3*a* and 3*b* showing the flow paths of the discrete eddy currents generated in the surfaces of the outer cylindrical structure and the parts of the insert in a field concentrator as depicted in FIGS. 2*a* and 2*b* as a result of magnetic pulsing.

Referring now to FIGS. 1*a* and 1*b* wherein there is shown an illustrative embodiment of a device constructed in accordance with the principles of the invention, the broken lines 11 and 11' respectively symbolize the longitudinal and transverse axes of symmetry. The device comprises a compression coil 8 containing therein a field concentrator which comprises two parts 12 and 13. Parts 12 and 13 of the field concentrator, as seen in cross-sectional aspect in FIG. 1*a*, are configured to be of stepped L-shaped configuration to accommodate therein a workpiece comprising a cylindrical rod 9 which has a uniform cross section along its entire length and of another body 10 which has one end which is narrower than its other end. Parts 12 and 13 which may suitably comprise copper-beryllium are insulated from each other by an insulating layer 14. A cylindrical insulating layer 15 is provided to insulate parts 12 and 13 from workpiece rod 9.

With the two-part construction of the field concentrator in the arrangement shown in FIGS. 1*a* and 1*b*, peripheral eddy currents are produced at the surface of both of parts 12 and 13 of the field concentrator.

In FIGS. 2*a*–2*d* wherein is shown another illustrative embodiment of a device constructed in accordance with the principles of the invention, in the interests of simplicity of depiction and explanation, the compresssion coil has been omitted. Thus, in these FIGURES there is shown the field concentrator of the device.

In such concentrator, which is of right circular cylindrical configuration at its outer periphery, broken lines 21 and 21' symbolize longitudinal and transverse axes of symmetry respectively. Cylindrical structure 22 actually is a known type of field concentrator and is provided with a radially disposed slot 23. In accordance with the invention, a cylindrical insert suitably comprised of copper-beryllium and comprised of two symmetrical semi-cylindrical halves 24 and 25 is provided, contained concentrically within structure 22. Halves 24 and 25 are insulated from each other by a diametrically disposed insulating layer 28, the diametrical disposed line of separation of halves 24 and 25 being in line with slot 23, insulating layer 28 also being provided in slot 23. The outer walls of halves 24 and 25 are insulated from the inner wall of field concentrator 22 by an insulating layer 26 and the inner walls of the halves 24 and 25 of the insert are insulated from a workpiece to be formed by an insulating layer 27.

FIG. 3*a* schematically illustrates the path of the eddy current, as shown by arrows 31, at the surface of the known type of slotted field concentrator.

FIG. 3*b* schematically shows the paths of the eddy currents as depicted by arrows 32 and 32' respectively at the surfaces of the two halves of a field concentrator constructed in accordance with the principles of the invention.

FIG. 3*c* shows the paths of the eddy currents at the surface of a field concentrator which, according to the invention, comprises a combination of the known unitary structure slotted field concentrator containing therein a snugly fitted concentrically disposed insulated insert comprising two symmetrical semi-cylindrical halves. The arrows bearing the numeral 33 indicate the direction and path of the eddy current at the surface of the outer, slotted field concentrator and the arrows which bear the numerals 34 and 34' respectively show the path of the eddy currents at the surfaces of insert halves respectively.

It will be obvious to those skilled in the art upon studying this disclosure that devices for forming metal workpieces according to our invention permit of a great variety of modifications and hence can be given embodiments other than those particularly illustrated and described herein without departing from the essential features of our invention and within the scope of the claims annexed hereto.

We claim:

1. In a device for forming metal workpieces by pulsed magnetic fields, a compression coil, a field concentrator comprising at least two portions each located oppositely spaced from one another in a direction transversely to a longitudinal axis and defining therebetween an opening having an axis substantially coinciding with said longitudinal axis for relatively intimately receiving therein an elongated workpiece having varying cross section along the length thereof, said two field concentrator portions with the opening therebetween being snugly contained within said coil, whereby a workpiece received in said opening is located also within said coil, and insulating means on the inner surface of said field concentrator portions within said opening and in the space between said portions for insulating said field concentrator from the workpiece and said field concentrator portions from one another, said insulating means extending radially within said space and having an outer limiting edge located substantially at the outer surface of said field concentrator.

2. In a device for forming metal workpieces by pulsed magnetic fields, a compression coil, and a field concentrator snugly contained within said coil, said field concentrator comprising at least two portions each located oppositely spaced from one another in a direction transversely to a longitudinal axis and defining therebetween an opening having an axis substantially coinciding with said longitudinal axis for relatively intimately receiving therein an elongated workpiece having varying cross section along the length therof, and insulating means on the inner surface of said field concentrator portions within said opening and in the space between said portions for insulating said field concentrator from the workpiece and said field concentrator portions from one another, said insulating means extending radially within said space and having an outer limiting edge located substantially at the outer surface of said field concentrator, said compression coil being of hollow substantially cylindrical outline, said field concentrator comprising a pair of symmetrical hollow semi-cylinders having an outer diameter substantially equal to the inner diameter of said coil, the interior hollow portion of said field concentrator comprising discrete contiguous regions of respective chosen different diameters along the longitudinal axis of said concentrator for receiving therein a workpiece comprising a cylindrical base member having a uniform diameter along its length which is substantially equal to the diameter of the narrowest cross section region of the interior of said field concentrator and a member on said base member and having an outer periphery substantially coincident with the other portions of said interior, and further including a diametrically disposed insulating layer between said semi-cylinders which has a length equal to the length of said coil and said cylinders.

3. In a device for forming metal workpieces as defined in claim 2 wherein said field concentrator comprises copper-beryllium.

4. In a device for forming metal workpieces by pulsed magnetic fields and comprising a compression coil, a field concentrator snugly contained within said coil which comprises a unitary hollow cylindrical outer structure having a radially disposed slot running the length of said concentrator, said outer structure having an interior comprising contiguous sections of differing diameters, a hollow cylindrical insert having an outer diameter substantially equal to the diameter of one of the end interior sections of said outer structure and an interior having a given diameter whereby there is defined in the interior of said field concentrator containing said insert, a space for receiving a workpiece comprising a cylindrical base member having a uniform diameter along its length and substantially equal to the inner diameter of said insert and another member whose outer periphery substantially coincides with the remainder of the inner periphery of said field concentrator, said insert comprising a plurality of parts which fit together to form said insert and are insulated from each other, means for insulating the opposing surfaces of said slot from each other, means for insulating the outer surface of said insert from said field concentrator and means for insulating the inner surface of said insert from said workpiece base member, whereby, upon the generation of a magnetic pulse in said concentrator, discrete peripheral eddy currents are produced in the respective surfaces of the outer cylindrical structure and said parts of said insert comprising said concentrator.

5. In a device for forming metal workpieces as defined in claim 4 wherein said insert comprises a pair of semi-cylindrical symmetrical halves and further including a diametrically disposed insulating layer having the length of said insert and disposed between the diametric surfaces of said halves, said last named means being in a substantially continuous radially disposed line with said slot.

6. A revice for forming metal workpieces as defined in claim 5 wherein said outer cylindrical structure and said insert comprise copper-beryllium.

References Cited

UNITED STATES PATENTS

| | | | |
|---|---|---|---|
| 3,126,937 | 3/1964 | Brower et al. | 72—56 |
| 3,195,335 | 7/1965 | Brower et al. | 72—56 |
| 3,253,443 | 5/1966 | Malmberg | 72—56 |
| 3,279,228 | 10/1966 | Brower | 72—56 |
| 3,318,127 | 5/1967 | Astleford | 72—56 |

RICHARD J. HERBST, *Primary Examiner.*